No. 12,608. REISSUED FEB. 12, 1907.

F. J. THOMAS.

TOOTH FOR EXCAVATING SHOVELS.

APPLICATION FILED NOV. 27, 1906.

Witnesses:
Harry Fleischer,
H. D. Penney

Inventor:
Frank J. Thomas
By his Attorney,
F. H. Richards.

UNITED STATES PATENT OFFICE.

FRANK J. THOMAS, OF GREENCASTLE, INDIANA.

TOOTH FOR EXCAVATING-SHOVELS.

No. 12,608. Specification of Reissued Letters Patent. Reissued Feb. 12, 1907.

Original No. 783,764, dated February 28, 1905. Application for reissue filed November 27, 1906. Serial No. 345,402.

*To all whom it may concern:*

Be it known that I, FRANK J. THOMAS, a citizen of the United States, residing in Greencastle, in the county of Putnam and State of Indiana, have invented certain new and useful Improvements in Tooth for Excavating-Shovels, of which the following is a specification.

This invention relates to excavators, dredges, and the like, and has for its principal object to provide a novel form of tooth for use at the cutting or digging edge of a bucket or scoop.

A further object of the invention is to provide a novel form of tooth having a removable point of hardened metal which will take all or practically all of the wear during the operation of the shovel and which may be readily renewed when worn away, a further object in this connection being to provide a removable point so constructed as to resist any spreading tendency during the digging operation.

A further object of the invention is to so construct the tooth and the point that there will be no strain on the securing devices, it being possible to retain the point in place by a simple securing-bolt of small size.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
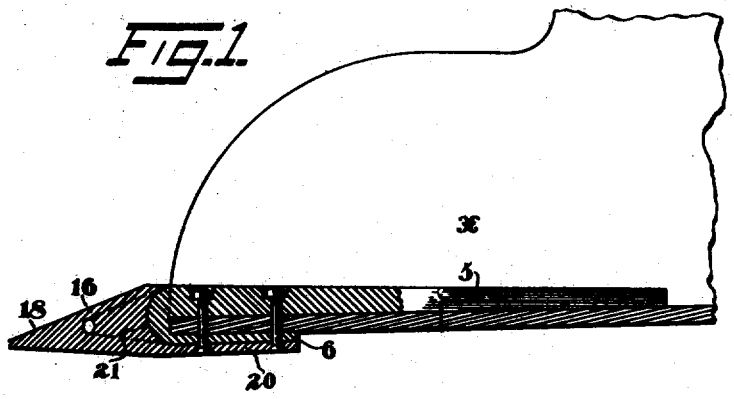
Figure 2:
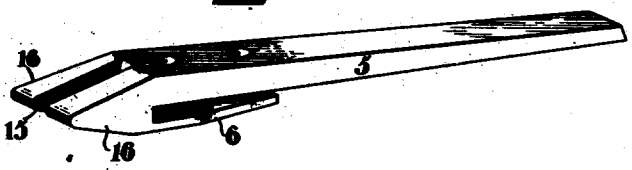
Figure 3:
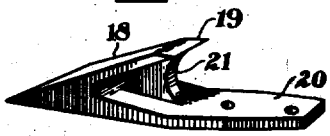

In the accompanying drawings, Figure 1 is a longitudinal sectional elevation of a portion of an excavating-shovel provided with a tooth constructed in accordance with the invention. Fig. 2 is a detail perspective view of the tooth proper, detached, and Fig. 3 is a similar view of the detachable point.

Similar characters of reference are employed to indicate corresponding parts throughout the several figures of the drawings.

The excavator-bucket $x$ is of the usual type, and to its forward or digging edge is secured a tooth of the construction best shown in Fig. 2. This tooth is recessed to form an upper jaw 5 and a lower jaw 6, that fit snugly against the opposite faces of the cutting edge of the bucket, the edge fitting snugly and firmly against the end wall of the recess, so that the thrust on the tooth is imparted directly to the latter and not through the intervention of bolts or other securing devices. The nose of the tooth is divided by a central recess 15 into a pair of tapered parallel lugs 16, that are provided with rounded points, while the end wall of the recess is arranged on a curved line, as best shown in Fig. 1.

The detachable point 18 has two jaws 19 and 20, the latter being of sufficient length to cover the whole of the bottom of the lower jaw 6 of the tooth, and both the jaws 6 and 20 are tapered toward their rear ends in order to reduce the extent of friction-surface and the amount of metal used. The wall at the juncture of the two jaws 19 and 20 is rounded to follow the contour of the rounded ends of the lugs 16, and the parts are arranged to fit very closely together, so that the point will not become jammed nor will there be any strain on the securing means.

In removable points of the general class to which the invention relates, especially where the points are bifurcated to form a pair of jaws, it is found that during the operation of the shovel there is a constant strain on said jaws in opposite directions, and the tendency of said jaws to spread while at work throws considerable strain on the securing devices, the latter becoming worn or broken after being used for a short time. In the present case this is prevented by a connecting web or rib 21, that firmly unites the two jaws to each other, and the rear edge of said web or rib is arranged on a curved line following the contour of the inner wall of the recess 15, so that the end wall of said recess will fit snugly against the end of the rib and the working strain will be transmitted directly from the tooth to the point, and the web, in addition to preventing any spreading movement of the jaws, serves, further, to prevent any tendency to lateral displacement, the tooth and point being locked transversely.

The points are preferably made of steel castings and are made in quantities, a number being supplied to each shovel; but as the points are not renewed very frequently the reserve supply will become oxidized to some extent and dirt will accumulate in the space between the two jaws, which may render it difficult to secure perfect fitting of a new point on the nose of the tooth. To overcome this difficulty, the inner end of the web 21 is recessed, so that a clean passage is formed from side to side of the point at the line of juncture of the two jaws, and any accumulations of dirt or rust may be readily removed.

With a tooth constructed in accordance with this invention all of the wear will be directly on the detachable point, the under surface of the jaw 20 of the latter protecting the whole of the lower face of the jaw 6 of the tooth, and as the parts are fitted snugly the strain transmitted from the shovel through the tooth and from the latter to the point is through parts that are in direct contact with each other, so that there is no tendency to shear the securing-bolts. Inasmuch as the parts are interlocked transversely there is no lateral strain on the bolts, and it is found that a single securing-bolt of comparatively small diameter is all that is necessary to hold the parts together. The securing bolts or bolt are arranged in countersunk openings in the jaw 20 of the point, and in the upper portion of the tooth are arranged recesses for the reception of nuts of said bolts.

The detachable points are formed of cast-steel, and the formation of the recess or opening in the web permits the cleaning out of the castings and insures the perfect fitting of the point. In these devices as usually constructed it is impossible to clean out or dress the casting if the latter is made of steel except at prohibitive cost; but in the present case the dressing may be readily accomplished and perfect fit insured.

Having thus described the invention, what is claimed is—

1. In a tooth for excavating-shovels and the like, a body portion comprising a pair of jaws for engaging the opposite faces of the shovel, and forwardly extended in the form of a pair of spaced lugs, and a detachable point having a web fitting between said lugs.

2. A tooth having a forwardly-projecting nose divided by a recess into two lugs, and a detachable point bifurcated to form a pair of jaws that embrace the two lugs, said jaws being united by a web that fits within the recess.

3. A tooth having a body portion recessed to form a pair of jaws that embrace the edge of the shovel, and a detachable point bifurcated to form a pair of jaws that embrace the nose of the tooth, the lower jaw being extended rearward to protect the whole of the lower surface of the lower jaw of said body portion.

4. A tooth having a forwardly-extended nose formed of a pair of tapered lugs disposed in spaced relation, the inner wall of the nose between said lugs being arranged on a curved line, and a detachable point having a pair of jaws embracing the nose, said jaws being rigidly connected by a web that is provided with a curved face fitting against the curved wall of the recess.

5. The combination with a tooth having a forwardly-extended nose that is provided with a recess, and a detachable point interlocking with the nose, said point being bifurcated to embrace the nose portion and having a central web fitting snugly within said recess.

6. The combination with a body portion bifurcated to form a pair of jaws for engaging the two surfaces of the shovel-blade, the forward end of the body portion being extended to form a nose that is divided by a central recess into two lugs, and a detachable point having a pair of jaws embracing the nose, the two jaws being connected by a web that extends from the rear edge of the upper jaw to a point intermediate of the length of the lower jaw.

7. The combination with a tooth having a body portion recessed for the reception of the shovel-blade, the forward end of said body portion being further extended to form a nose that is divided by an intermediate recess into a pair of lugs, and a detachable point having jaws embracing said lugs, the two jaws being connected by a vertical web, and the base portion of said web being provided with an opening to facilitate the removal of foreign matter between the jaws.

8. A shovel-tooth having a projecting recessed nose, and a detachable point having a web fitting within said recess.

9. A shovel-tooth having a projecting recessed end, and a detachable point provided with a web fitting within said recess, the base of the web having an opening to permit cleaning of the point.

10. A detachable point of the class specified, comprising an approximately wedge-shaped piece of metal bifurcated to form a pair of jaws, and an integral web for uniting the jaws to each other, said web having an opening for the passage of a cleaning-tool.

11. A detachable point, comprising an approximately wedge-shaped piece of metal bifurcated to form a pair of jaws, and an integral web uniting the jaws to each other.

12. A detachable point for a shovel-tooth, bifurcated in rear of its point to form a pair of jaws, and a web uniting said jaws.

13. A detachable point for a shovel-tooth, bifurcated in rear of its point to form a pair of jaws, and a web uniting said jaws and having a curved wall for contact with the nose of the tooth.

14. A shovel-tooth, comprising a body portion having a pair of jaws for engaging the opposite faces of the shovel, and a forwardly-extended bifurcated nose for the reception of a detachable point.

15. A shovel-tooth, having a forwardly-projecting nose provided with a recess dividing such nose into a pair of lugs for the reception of a detachable point.

16. A shovel-tooth, having a forwardly-extended nose formed of a pair of tapered lugs spaced apart for the reception of the web of a detachable point.

17. A shovel-tooth, having a forwardly-extending nose comprising a pair of tapered lugs spaced apart to form a recess for the reception of the web of a detachable point, the inner wall of said recess having a curved formation.

In testimony that I claim the foregoing as my own I have hereto affixed my signature in the presence of two witnesses.

FRANK J. THOMAS.

Witnesses:

GEORGE J. SADLER,

JOHN M. SHERRERD.